United States Patent
Aulia et al.

(10) Patent No.: US 12,491,545 B2
(45) Date of Patent: Dec. 9, 2025

(54) PIPELINE DESCALING TOOL

(71) Applicant: Saudi Arabian Oil Company, Dhahran (SA)

(72) Inventors: Fahmi Aulia, Udhailiyah (SA); Abdulrahman F. Almuaibid, Dhahran (SA); Surajit Haldar, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/772,436

(22) Filed: Jul. 15, 2024

(65) Prior Publication Data
US 2024/0367205 A1 Nov. 7, 2024

Related U.S. Application Data

(62) Division of application No. 17/984,492, filed on Nov. 10, 2022, now Pat. No. 12,064,796.

(51) Int. Cl.
*B08B 9/051* (2006.01)
*B08B 9/053* (2006.01)
*B08B 9/055* (2006.01)

(52) U.S. Cl.
CPC ............ *B08B 9/051* (2013.01); *B08B 9/0535* (2013.01); *B08B 9/0551* (2013.01); *B08B 2209/04* (2013.01)

(58) Field of Classification Search
CPC ... B08B 2209/04; B08B 9/051; B08B 9/0535; B08B 9/0551; B08B 9/0436
See application file for complete search history.

(56) References Cited

U.S. PATENT DOCUMENTS

| | | | |
|---|---|---|---|
| 4,938,167 A | 7/1990 | Mizuho et al. | |
| 6,264,537 B1 | 7/2001 | Penza | |
| 2012/0308321 A1 | 12/2012 | Onishi | |
| 2021/0245210 A1* | 8/2021 | Schiavon | F16L 55/32 |

FOREIGN PATENT DOCUMENTS

| | | | |
|---|---|---|---|
| CN | 203635569 | | 6/2014 |
| CN | 203635569 U | * | 6/2014 |
| WO | WO 2012150864 | | 11/2012 |

* cited by examiner

*Primary Examiner* — Douglas Lee
(74) *Attorney, Agent, or Firm* — Fish & Richardson P.C.

(57) ABSTRACT

A pipeline descaling tool includes a milling tool, a roller assembly and a motor. The milling tool can rotate about a longitudinal axis of the assembly and is sized to fit within an inner volume defined by a pipeline. The milling tool can mill, by rotating, solid obstructions protruding from an inner surface of the pipeline into the inner volume. The roller assembly includes multiple rollers. The roller assembly is axially coupled to the milling tool. The roller assembly can transport the pipeline tool assembly including the milling tool within the inner volume. The motor is connected to the roller assembly and to the milling tool. The motor can rotate the milling tool and power the roller assembly.

7 Claims, 5 Drawing Sheets

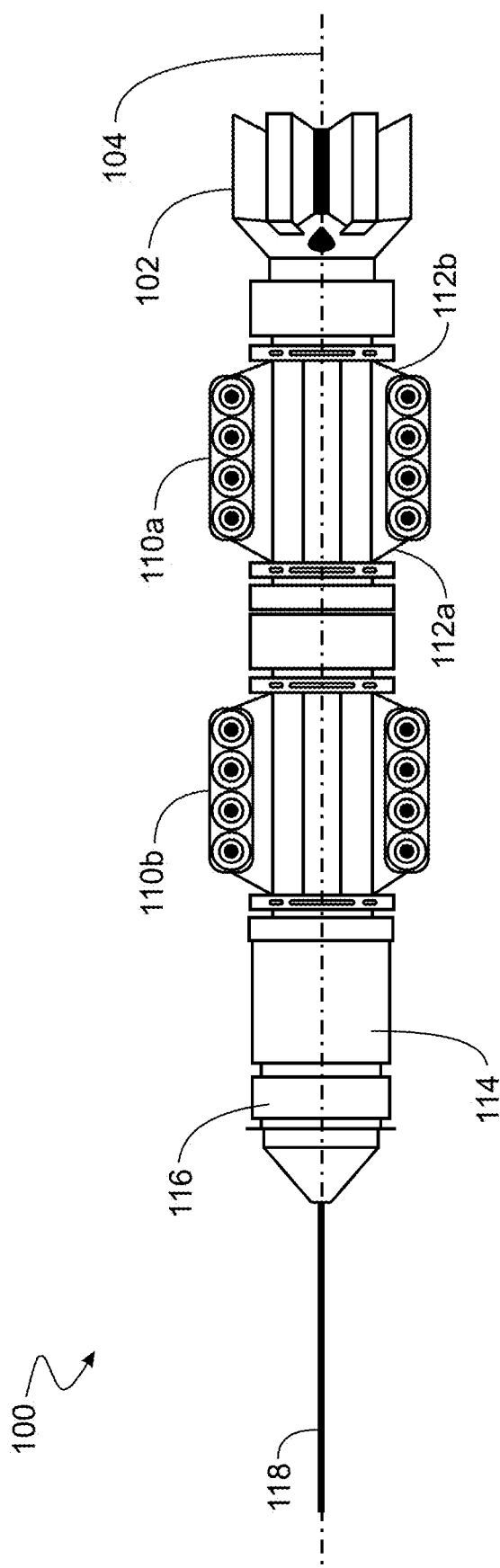
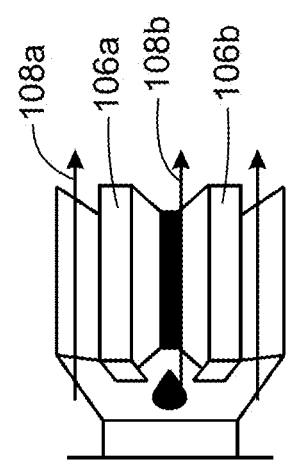
FIG. 1A
FIG. 1B

PIPELINE DESCALING TOOL

CROSS-REFERENCE TO RELATED PATENT APPLICATIONS

This application is a divisional of and claims the benefit of priority to U.S. patent application Ser. No. 17/984,492, filed on Nov. 10, 2022, the contents of which are incorporated by reference herein.

TECHNICAL FIELD

This disclosure relates to fluid flow through pipelines, specifically to tools to perform maintenance or repair within pipelines through which fluids are flowed.

BACKGROUND

Pipelines (or flowlines) are used to flow fluids, e.g., hydrocarbons including petroleum, natural gas or combinations of them) between locations. Often, the pipelines are made of metals, metal alloys or similar materials that can withstand both mechanical and chemical effects of the fluids flowed through the pipeline. Nevertheless, over time, the operating conditions within the pipeline or the properties of the fluids flowed through the pipelines can cause scaling within the pipeline. Scaling includes formation of solids on an inner surface (i.e., an inner wall) of the pipeline. Over time, the solids can extend into an inner volume of the pipeline and potentially obstruct fluid flow through the pipeline.

SUMMARY

This specification describes technologies relating to a pipeline descaling tool.

Certain aspects of the subject matter described here can be implemented as a pipeline tool assembly. The assembly includes a milling tool, a roller assembly and a motor. The milling tool can rotate about a longitudinal axis of the assembly and is sized to fit within an inner volume defined by a pipeline. The milling tool can mill, by rotating, solid obstructions protruding from an inner surface of the pipeline into the inner volume. The roller assembly includes multiple rollers. The roller assembly is axially coupled to the milling tool. The roller assembly can transport the pipeline tool assembly including the milling tool within the inner volume. The motor is connected to the roller assembly and to the milling tool. The motor can rotate the milling tool and power the roller assembly.

An aspect combinable with any other aspect includes the following features. The milling tool includes multiple teeth arranged circumferentially about the longitudinal axis. The multiple teeth are arranged to define a space in between to allow fluid circulation past the multiple teeth.

An aspect combinable with any other aspect includes the following features. The roller assembly includes a first set of rollers and a second set of rollers. The second set of rollers is axially positioned between the first set of rollers and the milling tool.

An aspect combinable with any other aspect includes the following features. The roller assembly is mounted on radially movable arms that can radially extend the multiple rollers towards the inner surface of the pipeline and radially retract the multiple rollers away from the inner surface of the pipeline.

An aspect combinable with any other aspect includes the following features. The motor can power movement of the radially movable arms.

An aspect combinable with any other aspect includes the following features. A socket is attached to the motor. The socket can be connected to a wireline that can be pulled to move the pipeline tool assembly within the pipeline.

An aspect combinable with any other aspect includes the following features. A controller is operatively coupled to the motor. The controller can regulate a current supplied by the motor to the milling tool based on a rate of penetration of the milling tool.

An aspect combinable with any other aspect includes the following features. The controller can be installed outside the pipeline.

Certain aspects of the subject matter described here can be implemented as a method to descale a pipeline using a pipeline tool assembly described here disposed in a pipeline. The motor transmits a current to the roller assembly to transport the pipeline tool assembly toward the solid obstructions and to the milling tool to mill the solid obstructions. A signal representing a weight on bit on the milling tool is received. Based on the received signal, the current to the roller assembly and to the milling tool is adjusted.

An aspect combinable with any other aspect includes the following features. The milling tool includes multiple teeth arranged circumferentially about the longitudinal axis. In response to receiving the current, the milling tool rotates the multiple teeth against the solid obstructions.

An aspect combinable with any other aspect includes the following features. The multiple teeth are arranged to define a space in between to allow fluid circulation past the multiple teeth. Cooling fluid is flowed in the space while rotating the multiple teeth against the solid obstructions.

An aspect combinable with any other aspect includes the following features. The roller assembly is mounted on radially movable arms that can radially extend the multiple rollers towards the inner surface of the pipeline. In response to receiving the current, the multiple rollers are radially extended toward the inner surface of the pipeline. The multiple teeth of the milling tool are rotated as or after the multiple rollers extend toward the inner surface of the pipeline.

An aspect combinable with any other aspect includes the following features. The radially movable arms can radially retract the multiple rollers away from the inner surface of the pipeline. After the milling tool mills the solid obstruction, the multiple rollers are radially retracted away from the inner surface of the pipeline.

An aspect combinable with any other aspect includes the following features. The pipeline tool assembly includes a socket attached to the motor. The socket is connected to a wireline extending partially within and partially outside the pipeline. The pipeline tool assembly is deployed at a first location within the pipeline. The pipeline tool assembly is transported to a second location within the pipeline. The wirelines is retracted to return the pipeline tool assembly from the second location to the first location.

An aspect combinable with any other aspect includes the following features. An inlet of a flowline is fluidically attached to a circumferential surface of the pipeline. After milling the solid obstructions, a fluid is flowed through the pipeline. The milled solid obstructions are flowed out of the pipeline through the flowline.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a schematic diagram of a pipeline tool assembly.

FIG. 1B is a schematic diagram of a milling tool of the pipeline tool assembly of FIG. 1A.

Like reference numbers and designations in the various drawings indicate like elements.

DETAILED DESCRIPTION

Figure 2:
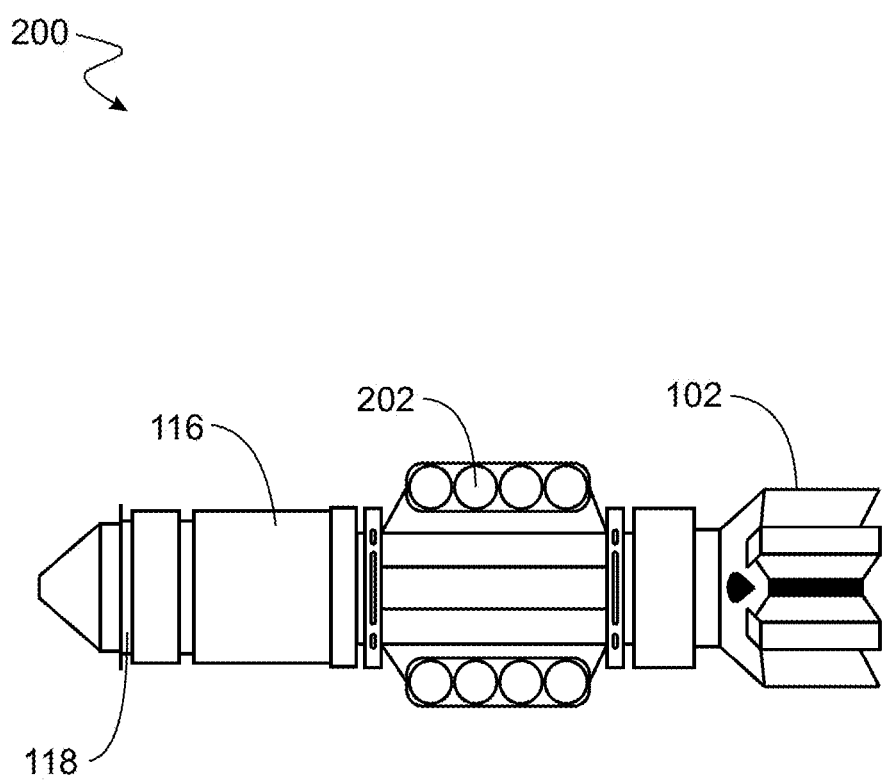
FIG. 2 is a schematic diagram of another pipeline tool assembly.

This disclosure describes a pipeline tool assembly configured to be deployed as a pipeline descaling tool. The tool assembly is configured to remove accumulated scale (or similar solid obstructions) that form on an inner surface of the pipeline and extend radially inward within an inner volume of the pipeline. As described below, the pipeline tool assembly includes a milling tool that rotates about a longitudinal axis of the pipeline. The rotating teeth of the milling tool contact the solid obstructions, dislodging them from the inner surface of the pipeline. Also, as described later, a roller assembly of the pipeline tool assembly transports the pipeline tool assembly to different locations within the pipeline. Upon completion of the descaling operations, the pipeline tool assembly can be removed from within the pipeline.

Implementations of the techniques described in this disclosure can result in one or more advantages. For example, the techniques described here can be implemented as alternatives to time consuming and comparatively less safe descaling techniques such as dismantling or cutting the pipeline, using hydro-jetting, sand/silica blasting or chemical descaling techniques. In addition or as alternatives to descaling, the techniques described here can be implemented to remove scrapers, pigging or similar tools that may get stuck within pipelines. With appropriate pressure control equipment (PCE), the techniques described here can be implemented in a live pipeline scenario in which the pipeline is pressurized and fluid flow through the pipeline is uninterrupted during descaling operations.

FIG. 1A is a schematic diagram of a pipeline tool assembly 100. The pipeline tool assembly 100 includes a milling tool 102 that can rotate about a longitudinal axis 104 of the pipeline tool assembly 100. The milling tool 102 is sized to fit within an inner volume defined by a pipeline and to mill, by rotating, solid obstructions protruding from an inner surface of the pipeline into the inner volume. FIG. 1B is a schematic diagram of the milling tool 102. The milling tool 102 includes multiple teeth (e.g., teeth 106a, 106b or more teeth) arranged circumferentially about the longitudinal axis 104. The multiple teeth are arranged to define spaces (schematically shown by arrows 108a, 108b) in between to allow fluid circulation past the multiple teeth. In some implementations, cooling fluid can be circulated through these spaces to cool the multiple teeth while milling. Also, the spaces allow fluid flow past the milling tool allowing uninterrupted fluid flow through the pipeline even when milling operations are being performed.

Returning to FIG. 1A, the pipeline tool assembly 100 includes a roller assembly that includes multiple rollers (e.g., 110a, 110b). The roller assembly is axially coupled to the milling tool 102. The roller assembly can transport the pipeline tool assembly 100 including the milling tool 102 within the inner volume of the pipeline. In some implementations, the roller assembly includes a first set of rollers 110b and a second set of rollers 110a. The second set of rollers 110a is positioned between the first set of rollers 110b and the milling tool 102. Each set of rollers is mounted on a pair of radially movable arms (e.g., arms 112a, 112b for second set of rollers 110a). An end of each arm is attached to the rollers, and another end of each arm is attached to the pipeline tool assembly body, e.g., on a hinge. In response to power (e.g., electrical or hydraulic power), the hinged ends can move radially outward (i.e., away from the longitudinal axis 104) or radially inward (i.e., toward the longitudinal axis 104). When the pipeline tool assembly 100 is deployed within the pipeline, the rollers can be close to the longitudinal axis 104 so minimize a radial space occupied by the pipeline tool assembly 100. Once deployed within the pipeline, the pair of arms can be activated to move the rollers radially outward until the rollers contact the inner surface of the pipeline. Later, the pair of arms can be activated to move the rollers radially inward and away from the inner surface of the pipeline.

The pipeline tool assembly 100 includes a motor 114 connected to the roller assembly and to the milling tool 102. The motor 114 is configured to rotate the milling tool 102 and to power the roller assembly. For example, the motor 114 is configured to simultaneously provide current to rotate the milling tool 102, to move the radially movable arms inward/outward relative to the longitudinal axis 104, and to rotate the multiple rollers in the roller assembly. In some implementations, the motor 114 can apply current to rotate the teeth of the milling bit 102 in a clockwise or counter-clockwise direction. In some implementations, the motor 114 can apply current to rotate the rollers in a clockwise or counter-clockwise direction. Rotation of the rollers in the clockwise direction can cause the pipeline tool assembly 100 to travel in one axial direction through the pipeline, while rotation of the rollers in the counter-clockwise direction can cause the pipeline tool assembly 100 to travel in the opposite axial direction through the pipeline.

The pipeline tool assembly 100 includes a socket 116, e.g., a rope socket, that is attached to the motor 114. The socket 116 can be connected to a wireline (e.g., the wireline 118) that can be pulled to move the pipeline tool assembly 100 within the pipeline. In some implementations, the socket 116 can be a joint or a coupling that can be attached to the motor 116 on one end and coupled to (e.g., tied to) the wireline 118 on the other end.

FIG. 2 is a schematic diagram of another pipeline tool assembly 200. The pipeline tool assembly 200 is substantially similar to the pipeline tool assembly 100 (FIG. 1A) except that the former has only one set of rollers 202 unlike the latter that has multiple sets of rollers. Using one set of rollers 202 can reduce the foot print of the pipeline tool assembly 200 and enable deploying the assembly 200 in pipelines with space constraints.

Figure 3:
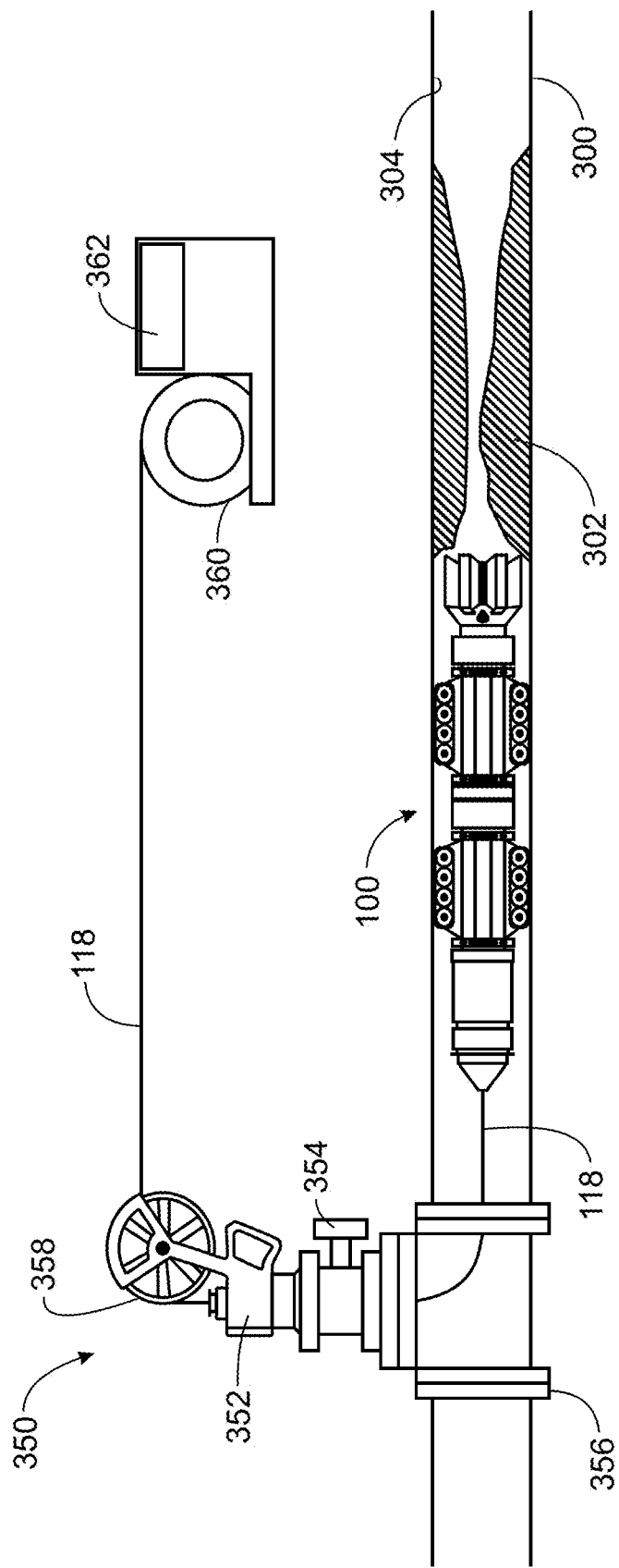
FIG. 3 is a schematic diagram of the pipeline tool assembly of FIG. 1A performing descaling operations within a pipeline.

FIG. 3 is a schematic diagram of the pipeline tool assembly of FIG. 1A performing descaling operations within a pipeline 300. The pipeline tool assembly 100 is disposed within the pipeline 300. Solid obstructions 302 (e.g., scales) are protruding from an inner surface 304 of the pipeline 300 into an inner volume of the pipeline 300. The pipeline tool assembly 100 is disposed within the pipeline 300 upstream of a location of the solid obstructions. The pipeline 300 is normally equipped with flange connections to install valves or other equipment, e.g., launcher for launching scraper or pipping into the pipeline 300. The flange connection can be used as the entry point to place the pipeline tool assembly 100 within the pipeline 300.

PCE 350 can be used in a live pipeline scenario where the pipeline is pressurized and the fluid flow inside the pipeline is uninterrupted. In such scenario, the flange connection is used to place the pipeline tool assembly 100 inside the pipeline 300. The rope socket 116 is used to connect the wire 118 (from the wireline drum/reel at surface) to the tool 100. The wire 118 is passed through the stuffing box 352 part of PCE 350 (that has sealing device to contain the pressure inside the pipe) to the sheave wheel 358 and to the wireline drum/reel 360. Once all is set-up, the PCE 350 is connected to the flange connection of the removed valve and the tool is ready to be operated.

The pipeline tool assembly 100 is positioned within (i.e., introduced into) the pipeline 300 using pressure control equipment (PCE) 350. The PCE 350 includes a stuffing box 352, a pump-in sub 354, an adaptor flange 356 that mounts to an outer surface of the pipeline 300, and a sheave wheel 358. The wireline 118 that is attached to the pipeline tool assembly 100 passes through the PCE 350 and is connected to a wireline drum 360 that spools the wireline 118.

A controller 362 is operatively coupled to the pipeline tool assembly 100, specifically to the motor 116. The controller 362 can be implemented as a computer system including one or more processors and a computer-readable medium storing computer instructions executable by the one or more processors to perform operations described here. Alternatively or in addition, the controller 362 can be implemented as processing circuitry, firmware, software, hardware or any combination of them. The controller 362 can operate the wireline drum 360 to spool or unspool the wireline 118. The controller 362 can also regulate a current supplied by the motor 116 to the milling tool 102 based on a rate of penetration of the milling tool 102. In the implementation shown in FIG. 3, the controller 362 is deployed outside the pipeline 300. In some implementations, the controller 362 can be deployed on the pipeline tool assembly 100 or can be distributed between the pipeline tool assembly 100 and locations outside the pipeline 300.

In an example operation, the presence of solid obstructions 302 (e.g., scales) within the pipeline 300 is determined, e.g., based on monitoring properties of fluids flowed through the pipeline 300. Using the PCE 350, the pipeline tool assembly 100 is introduced into the pipeline 300 upstream of the solid obstructions 302. The controller 362 transmits an instruction (e.g., a data signal) to the motor 116 to transmit current to the milling tool 102 and to the roller assembly. In response, the motor 116 transmits the current to the milling tool 102 causing the milling tool 102 to rotate about the longitudinal axis of the pipeline tool assembly 100. Simultaneously, the motor 116 transmits the current to the pair of radially movable arms to cause the rollers to move radially outward until the rollers contact the inner surface 304 of the pipeline. The motor 116 then transmits the current to cause the rollers to rotate which, in turn, causes the pipeline tool assembly 100 to travel in the downstream direction towards the solid obstructions 302. The rotating milling bit 102 mills the solid obstructions 302 causing the obstructions to be released and carried downstream by the flowing fluid. In some implementations, the controller 362 can control a speed at which the rollers roll or a speed at which the milling bit rotates based on a rate of penetration (ROP) of the milling bit 102. For example, in response to a low the ROP of the milling bit 102, the controller 362 can reduce the speed of the rollers and increase a speed of rotation of the milling bit 102. In another example, the controller 362 can measure a distance traveled by the pipeline tool assembly (e.g., based on a length of the wireline 118 being unspooled). The controller 362 can use the distance traveled to measure the depth of penetration and the effectiveness of milling. To do so, the controller 362 can independently adjust the current transmitted by the motor to the rollers and the milling tool 102.

The pipeline tool assembly 100 can travel a distance within the pipeline 300 sufficient to remove all solid obstructions 302. For example, the controller 362 can determine that the solid obstructions 302 have been removed based on a change in flow properties (e.g., pressure) within the pipeline 300. Then, the controller 362 can transmit a signal to cause the pipeline tool assembly 100 to return to its initial position. In response to the signal, the motor 116 transmits a current causing the rollers to rotate in the opposite direction. Alternatively, the motor 116 can transmit a current causing the pair of radially movable arms to move the rollers towards the longitudinal axis of the pipeline tool assembly 100, i.e., away from the inner surface 304 of the pipeline 300. Then, by operating the wireline drum 360, the pipeline tool assembly 100 can be pulled back to its initial location using the wireline 118.

Figure 4:
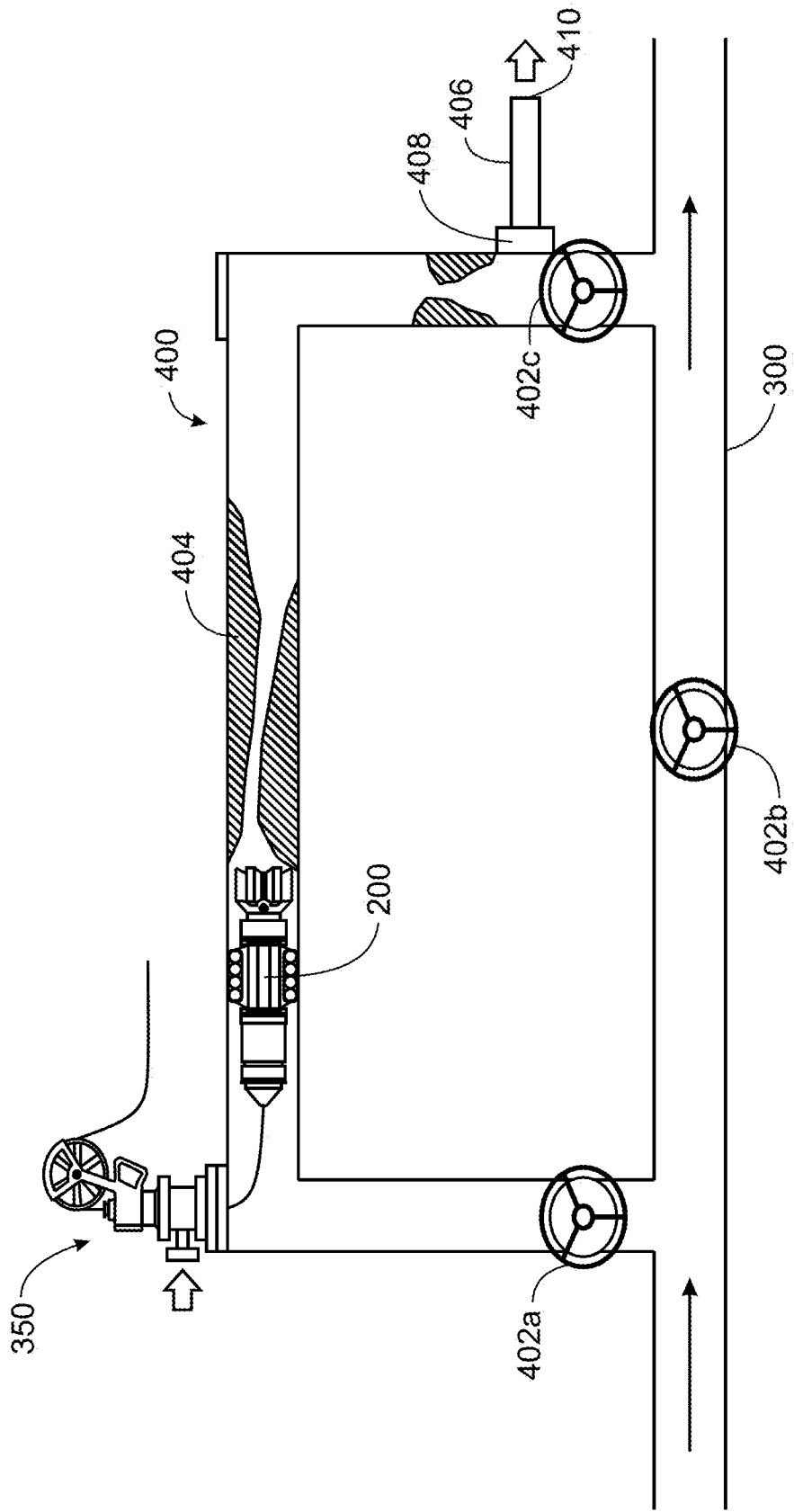
FIG. 4 is a schematic diagram of an arrangement of valves deployed to perform descaling operations using the pipeline tool assembly of FIG. 1A.

FIG. 4 is a schematic diagram of an arrangement of valves deployed to perform descaling operations using the pipeline tool assembly 100 (FIG. 1A) or the pipeline tool assembly 200 (FIG. 2). In some implementations, a flowmeter loop line 400 can be fluidically coupled to the pipeline 300 to sample fluid flow through the pipeline 300, e.g., to determine flow properties of the fluid. The flowmeter loop line 400 includes a series of pipes fluidically connected to each other and to the pipeline 300. The flowmeter loop line 400 includes multiple valves (e.g., valves 402a, 402b, 402c), each installed in a respective pipe and that is operable to direct fluid flow through the flowmeter loop line 400. For example, by closing valve 402b and opening valves 402a and 402c, fluid flow can be diverted from the main pipeline 300 to within the flowmeter loop line 400. Later, by closing valve 402a and valve 402c and opening valve 402b, fluid flow can be returned to the main pipeline 300 from the flowmeter loop line 400.

In some situations, scales or other solid obstructions 404 can form in the pipes of the flowmeter loops line 400. Using the PCE 350, a pipeline tool assembly (e.g., the assembly 100 of FIG. 1A or the assembly 200 of FIG. 2) can be introduced into a pipe of the flowmeter loop line 400 in which the solid obstructions 404 are detected. By operating the valves, fluid can be drained from the pipe, and the pipeline tool assembly operated (as described earlier) to remove solid obstructions. The operations can be repeated for each pipe of the flowmeter loop line 400 in which solid obstructions are detected. Then, by operating the valves, fluid flow through the pipe can be resumed. In some implementations, a drain line 406 (e.g., a pipe) can be fluidically connected to a pipe of the flowmeter loop line 400. An inlet 408 of the drain line 406 can be fluidically coupled to a circumferential surface of a pipe of the flowmeter loop line 400. An outlet 410 of the drain line 406 can drain to atmosphere. After removing solid obstructions in the flowmeter loop line 400, when fluid flow through the flowmeter loop line 400 is resumed, the solid obstructions can be flowed out of the flowmeter loop line 400 through the drain line 406. In some implementations, flow through the drain line 406 can be controlled by a valve (not shown) installed in the drain line 406.

Figure 5:
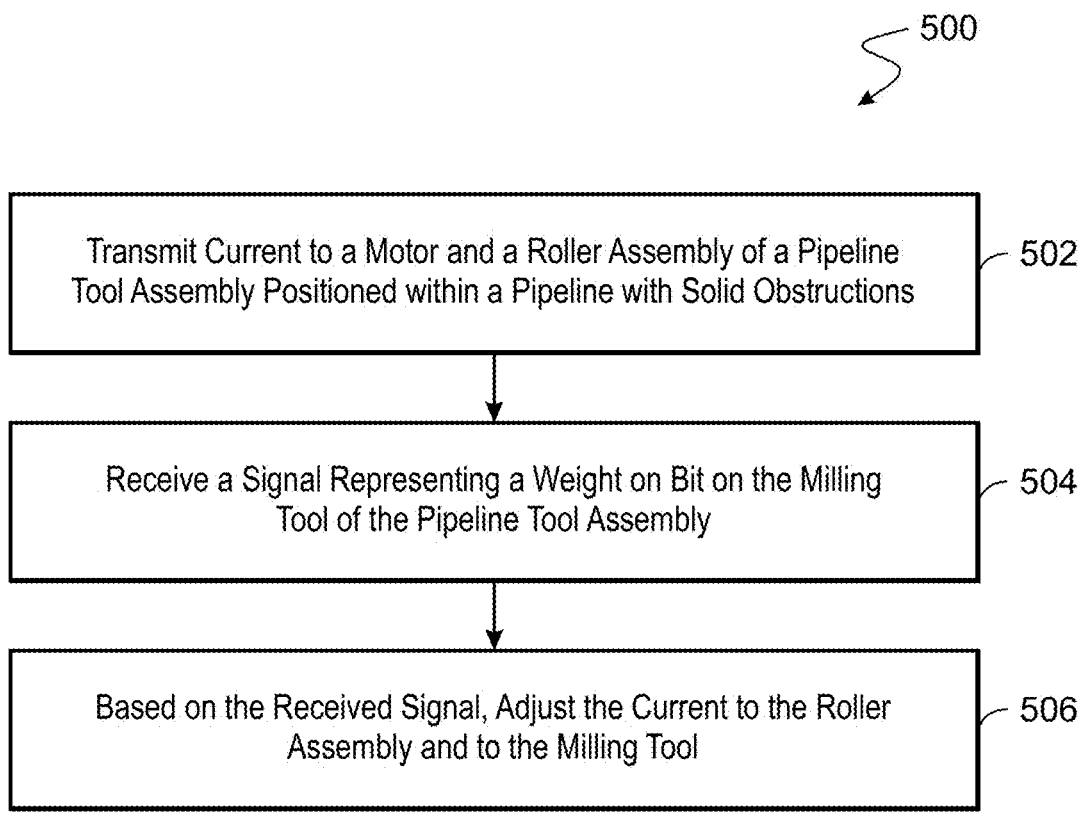
FIG. 5 is a flowchart of an example of a process of using the pipeline tool assembly of FIG. 1A.

FIG. 5 is a flowchart of an example of a process 500 of using the pipeline tool assembly of FIG. 1A (or that of FIG. 2) to physical break scales or any other type of solid obstruction that forms on an inner surface of a pipeline through which fluids (e.g., hydrocarbons or other fluids) are flowed. The pipeline tool assembly is disposed within the pipeline, e.g., using the PCE 350 (FIG. 3) described earlier. At 502, the motor of the pipeline tool assembly transmits a current to the roller assembly of the pipeline tool assembly to transport the pipeline tool assembly toward the solid obstructions and to the milling tool to mill the solid obstructions. At 504, a signal is received, e.g., by the controller 362, representing a weight on bit on the milling tool of the pipeline tool assembly. At 506, based on the received signal, the current to the roller assembly and to the milling tool are adjusted.

Thus, particular implementations of the subject matter have been described. Other implementations are within the scope of the following claims.

The invention claimed is:

1. A method to descale a pipeline, the method comprising:
in a pipeline in which a pipeline tool assembly is disposed, the pipeline tool assembly comprising:
a milling tool configured to rotate about a longitudinal axis of the pipeline tool assembly, the milling tool sized to fit within an inner volume defined by a pipeline and to mill, by rotating, solid obstructions protruding from an inner surface of the pipeline into the inner volume;
a roller assembly comprising a plurality of rollers, the roller assembly axially coupled to the milling tool, the roller assembly configured to transport the pipeline tool assembly including the milling tool within the inner volume, and
a motor connected to the roller assembly and to the milling tool, the motor configured to rotate the milling tool and to power the roller assembly:
transmitting, by the motor, a current to the roller assembly to transport the pipeline tool assembly toward the solid obstructions and to the milling tool to mill the solid obstructions;
receiving a signal representing a weight on bit on the milling tool; and
based on the received signal, adjusting the current to the roller assembly and to the milling tool.

2. The method of claim 1, wherein the milling tool comprises a plurality of teeth arranged circumferentially about the longitudinal axis, the method further comprising, in response to receiving the current, rotating, by the milling tool, the plurality of teeth against the solid obstructions.

3. The method of claim 2, wherein the plurality of teeth are arranged to define a space in between to allow fluid circulation past the plurality of teeth, the method further comprising flowing cooling fluid in the space while rotating the plurality of teeth against the solid obstructions.

4. The method of claim 2, wherein the radially movable arms are configured to radially retract the plurality of rollers away from the inner surface of the pipeline, wherein the method further comprises, after the milling tool mills the solid obstruction, radially retracting the plurality of rollers away from the inner surface of the pipeline.

5. The method of claim 1, wherein the roller assembly is mounted on radially movable arms configured to radially extend the plurality of rollers toward the inner surface of the pipeline, wherein the method further comprises:
in response to receiving the current, radially extending the plurality of rollers toward the inner surface of the pipeline; and
rotating the plurality of teeth of the milling tool as or after the plurality of rollers extend toward the inner surface of the pipeline.

6. The method of claim 1, wherein the pipeline tool assembly comprises a socket attached to the motor, the socket connected to a wireline extending partially within and partially outside the pipeline, the pipeline tool assembly deployed at a first location within the pipeline, the pipeline tool assembly transported to a second location within the pipeline, the method further comprising retracting the wireline to return the pipeline tool assembly from the second location to the first location.

7. The method of claim 1, further comprising:
fluidically attaching an inlet of a flowline to a circumferential surface of the pipeline;
after milling the solid obstructions, flowing a fluid through the pipeline; and
flowing the milled solid obstructions out of the pipeline through the flowline.

\* \* \* \* \*